United States Patent
Faletti et al.

(10) Patent No.: US 12,187,544 B2
(45) Date of Patent: Jan. 7, 2025

(54) INSTRUMENT CONVEYANCE USING A SHUTTLE

(71) Applicant: Capital One Services, LLC, McLean, VA (US)

(72) Inventors: Steve Faletti, Brooklyn, NY (US); David Kelly Wurmfeld, Fairfax, VA (US); Scott R Neilson, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 950 days.

(21) Appl. No.: 17/248,809

(22) Filed: Feb. 9, 2021

(65) Prior Publication Data

US 2022/0250853 A1    Aug. 11, 2022

(51) Int. Cl.
| | |
|---|---|
| *B65G 43/00* | (2006.01) |
| *B65G 17/12* | (2006.01) |
| *B65G 51/26* | (2006.01) |
| *B65G 51/34* | (2006.01) |
| *G05B 19/042* | (2006.01) |
| *G07D 11/16* | (2019.01) |

(52) U.S. Cl.
CPC .......... *B65G 43/00* (2013.01); *B65G 17/12* (2013.01); *B65G 51/26* (2013.01); *B65G 51/34* (2013.01); *G05B 19/042* (2013.01); *G07D 11/16* (2019.01); *G05B 2219/2641* (2013.01); *G07D 2211/00* (2013.01)

(58) Field of Classification Search
CPC ........ B65G 43/00; B65G 17/12; B65G 51/26; B65G 51/34; G07D 11/16; G07D 2211/00; G05B 19/042; G05B 2219/2641; Y10S 902/08; G07F 19/20
See application file for complete search history.

(56) References Cited

U.S. PATENT DOCUMENTS

| | | | |
|---|---|---|---|
| 1,712,536 A * | 5/1929 | Weigele ................. | B65G 51/06 406/37 |
| 10,621,833 B1 | 4/2020 | Dadhaniya et al. | |

(Continued)

FOREIGN PATENT DOCUMENTS

| | | | | |
|---|---|---|---|---|
| EP | 0841644 A2 * | 5/1998 | ............. | G07D 11/40 |
| EP | 2068285 A1 * | 6/2009 | ............. | B65G 51/06 |

(Continued)

*Primary Examiner* — Jacob S. Scott
*Assistant Examiner* — Erin Morris
(74) *Attorney, Agent, or Firm* — Harrity & Harrity, LLP

(57) ABSTRACT

A system for instrument conveyance may include a shuttle device including an internal compartment for containing instruments; at least one handling unit configured to dispense instruments, where the handling unit includes: an opening mechanism configured to open the shuttle device to expose the internal compartment of the shuttle device, and a loading mechanism configured to load instruments into the internal compartment of the shuttle device; at least one head unit configured to obtain input from a user in connection with a transaction involving instruments; and a transportation system disposed between the at least one handling unit and the at least one head unit, where the transportation system is configured to transport the shuttle device between the at least one handling unit and the at least one head unit.

20 Claims, 6 Drawing Sheets

(56) References Cited

U.S. PATENT DOCUMENTS

| | | | |
|---|---|---|---|
| 10,665,065 B2 | 5/2020 | Faletti et al. | |
| 2007/0173972 A1* | 7/2007 | Owens | B65G 51/32 |
| | | | 700/232 |
| 2016/0096691 A1* | 4/2016 | Gross | B65G 51/44 |
| | | | 406/10 |

FOREIGN PATENT DOCUMENTS

| | | | | |
|---|---|---|---|---|
| JP | 2020125181 A | * | 8/2020 | |
| WO | WO-2012172275 A1 | * | 12/2012 | B65G 51/06 |

* cited by examiner

INSTRUMENT CONVEYANCE USING A SHUTTLE

BACKGROUND

An automated teller machine (ATM) is an electronic device that enables users to perform transactions without having to interact with other people. Such transactions may include depositing or withdrawing cash, depositing checks, and/or reviewing account information, among other examples.

SUMMARY

In some implementations, a system for instrument conveyance includes a shuttle device including an internal compartment for containing instruments; at least one handling unit configured to dispense instruments, where the handling unit includes: an opening mechanism configured to open the shuttle device to expose the internal compartment of the shuttle device, and a loading mechanism configured to load instruments into the internal compartment of the shuttle device; at least one head unit configured to obtain input from a user in connection with a transaction involving instruments; and a transportation system disposed between the at least one handling unit and the at least one head unit, where the transportation system is configured to transport the shuttle device between the at least one handling unit and the at least one head unit.

In some implementations, a handling unit includes a dispenser configured to contain instruments for dispensing to a shuttle device; a shuttle dock configured to dock the shuttle device at the handling unit; an opening mechanism configured to open the shuttle device to expose an internal compartment of the shuttle device; and a loading mechanism configured to load instruments from the dispenser into the internal compartment of the shuttle device.

In some implementations, a method of instrument conveyance includes receiving, by a processor, an instruction based on a user input in connection with a transaction involving instruments being performed at a head unit; causing, by the processor and based on receiving the instruction, a shuttle device to dock at a shuttle dock of a handling unit; causing, by the processor, an opening mechanism of the handling unit to open the shuttle device docked at the shuttle dock to expose an internal compartment of the shuttle device; causing, by the processor, a loading mechanism of the handling unit to load one or more instruments, in accordance with the instruction, into the internal compartment of the shuttle device; and causing, by the processor, the shuttle device to travel from the handling unit to the head unit via a transportation system disposed between the handling unit and the head unit.

DETAILED DESCRIPTION

Figure 1A:
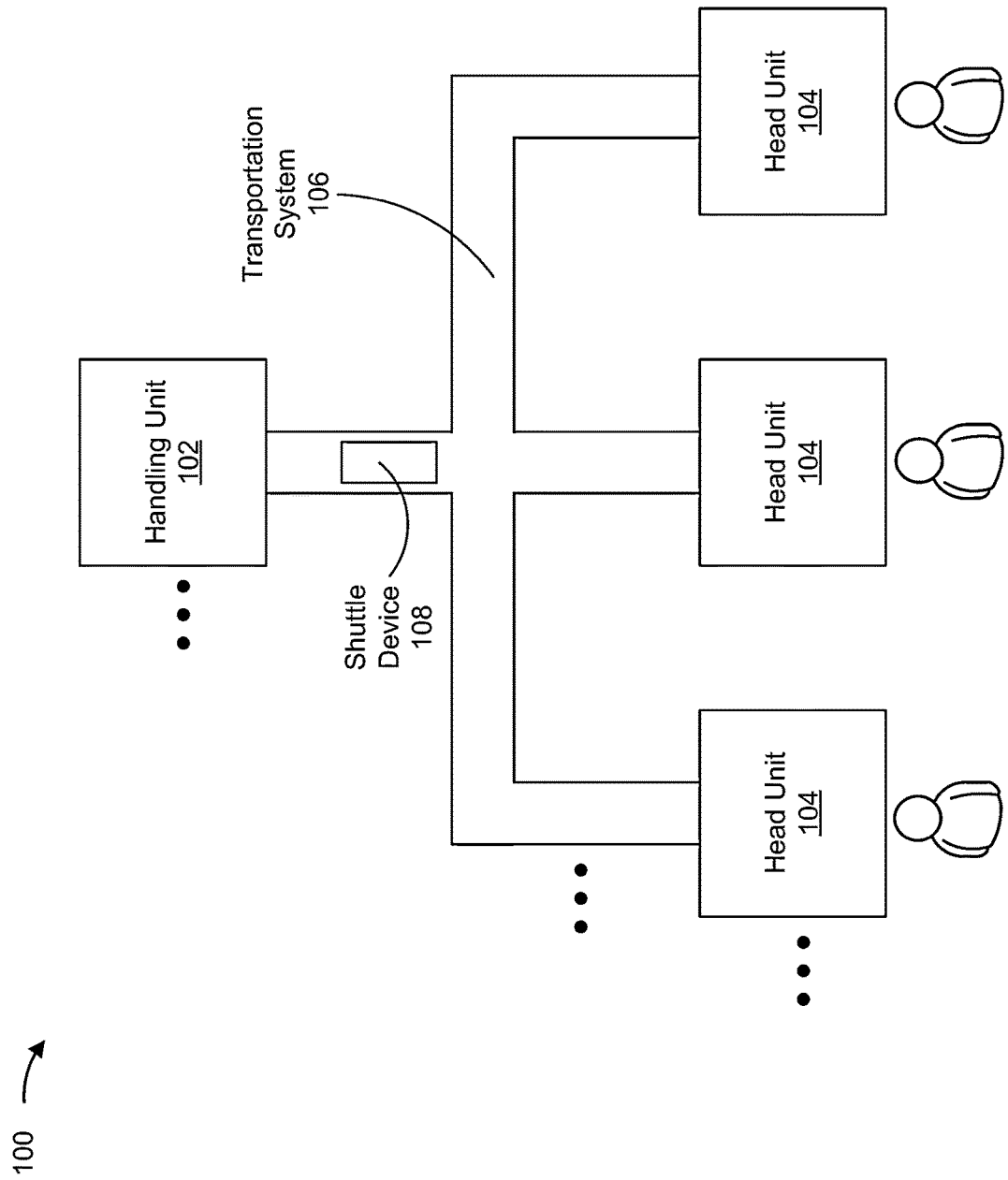
FIGS. 1A-1C are diagrams of an example implementation relating to instrument conveyance using a shuttle.

The following detailed description of example implementations refers to the accompanying drawings. The same reference numbers in different drawings may identify the same or similar elements.

An ATM includes a user-facing (e.g., a customer-facing) presenter opening through which a user may remove or insert instruments (e.g., cash, notes, checks, or other bank media) in connection with a transaction performed at the ATM. Due to difficulties in moving instruments long distances (e.g., using conveyors or rollers) storage components (e.g., a safe or a vault) for instrument dispensing, depositing, and/or recycling are typically enclosed in the ATM in close proximity to the presenter opening. Thus, these storage components are located in vulnerable areas that are publicly accessible. For example, it is common for the presenter opening to be used as a conduit to access the storage components during an attack on the ATM. The attack on the ATM may result in theft of the stored instruments as well as damage to the ATM.

In some cases, a financial institution may employ a shuttle in a pneumatic conduit system to convey instruments between a teller, located in a protected area, and a user located in a publicly-accessible area. However, these systems require a substantial amount of manual interaction from the teller and the user. For example, in a typical scenario, the teller manually loads instruments into the shuttle and places the shuttle into the conduit system. Continuing with the example, the user removes the shuttle from the conduit system, opens the shuttle, and retrieves the instruments. Thus, current conduit systems are inefficient, provide a poor user experience, and expose the shuttle to theft or damage.

Some implementations described herein provide a system for instrument conveyance that solves the problems described above. The system may include a handling unit (e.g., for instrument dispensing, depositing, and/or recycling) that is not user facing or publicly accessible, and a head unit that is user facing and publicly accessible. Instruments are stored at the handling unit, rather than at the head unit, for protection from theft. Accordingly, the system conserves resources (e.g., computing resources and/or network resources) that would have otherwise been used to identify, investigate, and mitigate theft. Moreover, because the instruments are not stored at the head unit, thieves are less likely to attempt an attack of the head unit, thereby reducing the incidence of damage to the head unit and permitting greater uptime of the head unit.

The system may also include a transportation system (e.g., a conduit system) configured to transport a shuttle that carries instruments between the handling unit and the head unit. In some implementations, the shuttle may be docked at a dispenser of the handling unit and automatically opened for loading of instruments to the shuttle. Moreover, the handling unit may include one or more mechanisms for automatically loading and/or unloading the shuttle with instruments. Accordingly, the shuttle may be used for moving media between the handling unit and the head unit without manual interaction by a teller, thereby improving efficiency. Moreover, by removing the presenting mechanism from the head unit, the head unit can be manufactured with greater simplicity.

Figure 1B:
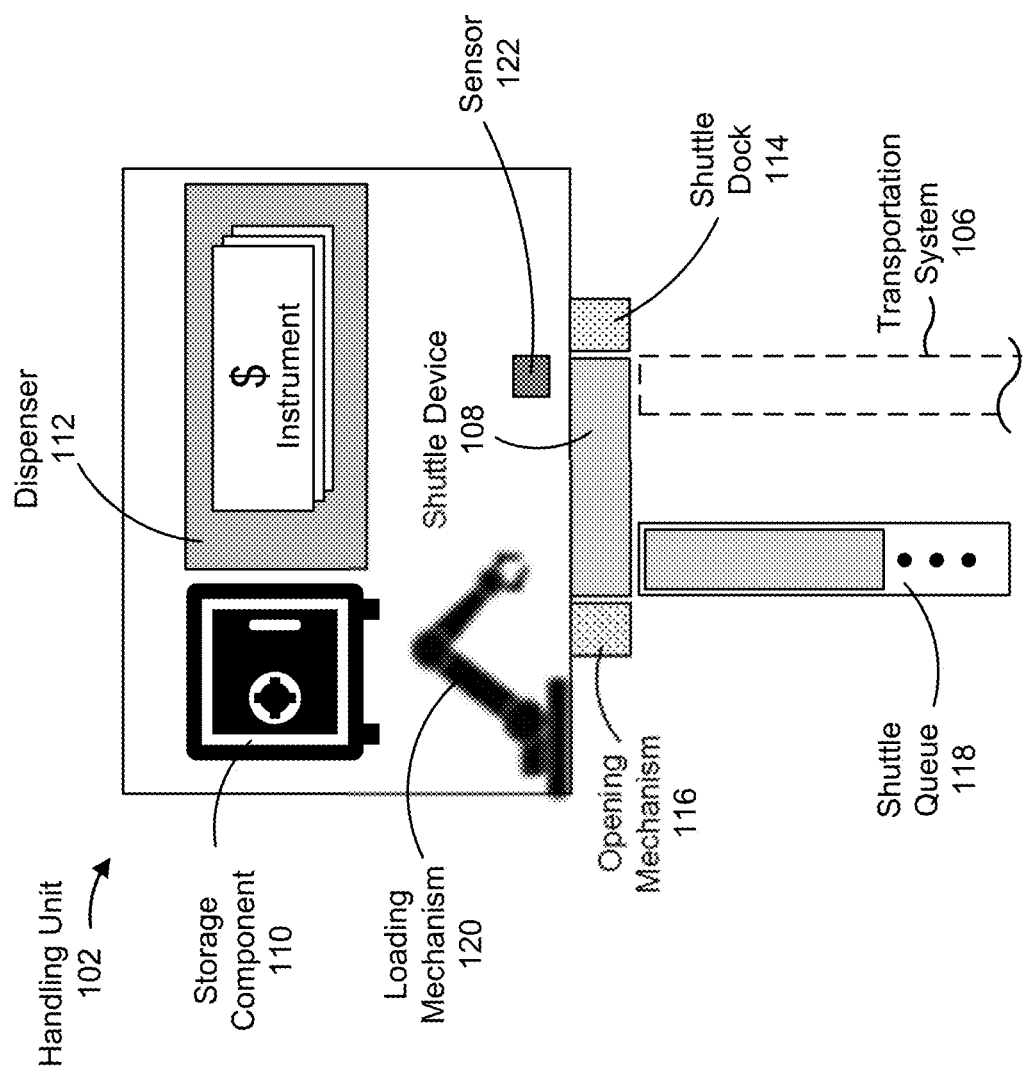
Figure 1C:
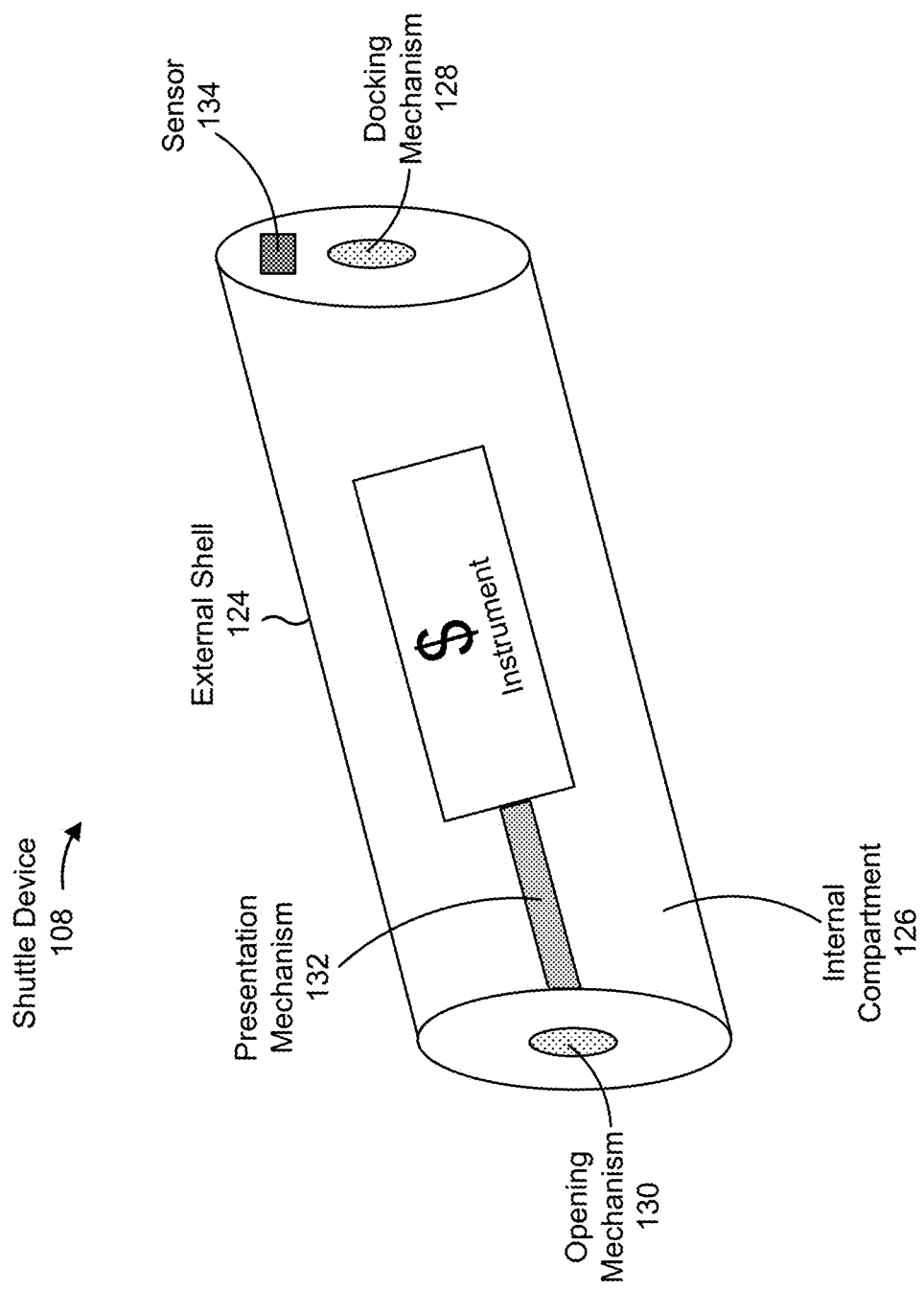

FIGS. 1A-1C are diagrams of an example implementation relating to instrument conveyance using a shuttle. FIG. 1A is a diagram of an example system 100 for instrument conveyance. As shown in FIG. 1A, the system 100 includes a handling unit 102, a head unit 104, a transportation system 106, and a shuttle device 108. These devices are described in more detail in connection with FIGS. 2 and 3. The system 100 may be used to convey one or more instruments (e.g., cash, notes, checks, deposit slips, or other bank media) between the handling unit 102 and the head unit 104. Thus, the handling unit 102 may be remotely located from the head unit 104. In other words, the handling unit 102 and the head unit 104 are not directly attached and do not share a housing.

The handling unit 102 may be configured to dispense and/or accept instruments. For example, the handling unit 102 may include one or more devices for dispensing instruments, depositing instruments, and/or recycling instruments (e.g., dispensing of deposited instruments). The handling unit 102 may include an instrument storage component configured to store instruments to be dispensed and/or instruments that have been deposited. The handling unit 102 may be located in a protected area that is not user facing or publicly accessible. For example, the handling unit 102 may be located within a building, such as in an area of the building that is not publicly accessible (e.g., in a vault or in an access-controlled area). In some implementations, the system 100 may include a plurality of handling units 102. Some of the plurality of handling units 102 may perform the same function (e.g., dispensing and/or depositing), or each of the plurality of handling units 102 may perform different functions.

The head unit 104 may be configured to obtain input from a user in connection with a transaction that involves instruments (e.g., a transaction relating to withdrawing instruments and/or depositing instruments). The head unit 104 may include one or more input devices (e.g., a touch screen and/or a keypad) configured to receive user input. The head unit 104 may be user facing and may be located in an area that is publicly accessible. For example, the head unit 104 may be located outdoors or in an area of a building that is publicly accessible. In some implementations, the system 100 may include a plurality of head units 104. The system 100 may include a quantity of head units 104 that is greater than a quantity of handling units 102 of the system 100. In this way, a relatively fewer quantity of handling units 102 may service a relatively greater quantity of head units 104, thereby enabling the system 100 to include a large quantity of head units 104 for simultaneously executing user transactions.

In some implementations, the head unit 104 may be free of an instrument storage component, as described above. In some implementations, the head unit 104 may be free of an instrument presenting mechanism, which is a mechanism that ejects instruments through an opening of the head unit 104 for retrieval by a user. An instrument presenting mechanism may include a system of rollers, conveyors, or the like, to move instruments from the instrument storage component to an exterior of the head unit 104.

The transportation system 106 may be disposed between the handling unit 102 and the head unit 104. The transportation system 106 may be configured to transport the shuttle device 108 (e.g., one or more shuttle devices, such as in concert) between the handling unit 102 and the head unit 104 (e.g., between one or more handling units 102 and one or more head units 104). The shuttle device 108 may be configured to transport instruments between the handling unit 102 and the head unit 104 via the transportation system 106. In some implementations, the transportation system 106 may be configured to transport the shuttle device 108 between the handling unit 102 and another handling unit 102 or another device that performs processing of instruments or stores instruments. Additionally, or alternatively, the transportation system 106 may be configured to transport the shuttle device 108 between the head unit 104 and another head unit 104 (e.g., for transporting a deposit at the head unit 104 to fulfill a withdrawal at the other head unit 104 without use of the handling unit 102).

The transportation system 106 may include one or more conduits, such as tubes. For example, the transportation system 106 may include a plurality of interconnecting conduits. In some implementations, the transportation system 106 may include a pneumatic source for pneumatically driving the shuttle device 108 through the transportation system 106. Additionally, or alternatively, the transportation system 106 may include rollers (e.g., drive wheels) and/or conveyors to drive the shuttle device 108. Additionally, or alternatively, the transportation system 106 and the shuttle device 108 may be configured for electromagnetic propulsion of the shuttle device 108. In some implementations, the shuttle device 108 may be autonomous and/or self-propelled through the transportation system 106 (e.g., the shuttle device 108 may include wheels or tracks that are driven by a motor of the shuttle device 108).

Each handling unit 102 of the system 100 may interface with an end, or an opening, of a conduit, and each head unit 104 of the system 100 may interface with an end, or an opening, of a conduit. Between conduit ends, the transportation system 106 may include one or more interconnecting conduit paths or branches. In this way, the transportation system 106 may transport the shuttle device 108 between any given handling unit 102 and any given head unit 104. In addition, the transportation system 106 may include one or more shuttle holding conduits (e.g., shuttle queueing/waiting areas) configured to cycle shuttles that are not being actively transported in the transportation system 106. In some implementations, shuttles that are not being actively transported in the transportation system 106 may dock at respective head units 104 to await commencement of a transaction.

In some implementations, the transportation system 106 may include switches at one or more intersections of the conduits to enable proper routing of the shuttle device 108 through the transportation system 106. Moreover, the transportation system 106 may include a plurality of sensors for tracking a location of the shuttle device 108 through the transportation system 106. For example, the transportation system 106 may include a plurality of optical sensors configured to read a marking (e.g., a barcode) on the shuttle device 108. As another example, the shuttle device 108 may include a radio-frequency identification (RFID) tag (or another short-range wireless communication tag) and the transportation system 106 may include a plurality of RFID readers configured to receive information from the RFID tag of the shuttle device 108. In some implementations, the transportation system 106 and/or the shuttle device 108 may employ dead-reckoning position tracking for tracking a location of the shuttle device 108. In some implementations, the transportation system 106 may include one or more force or pressure sensors (e.g., in a roller or a conveyor of the transportation system 106), configured to detect a presence of the shuttle device 108, for tracking a location of the shuttle device 108.

In some implementations, the system 100 may include a control system (e.g., that includes one or more memories and one or more processors communicatively coupled to the one or more memories). The control system may be centralized (e.g., the handling unit 102, the head unit 104, and/or the transportation system 106 may communicate with the centralized control system) or may be distributed among the handling unit 102, the head unit 104, and/or the transportation system 106 (e.g., the handling unit 102, the head unit 104, and/or the transportation system 106 may communicate directly with each other).

In operation of the system 100, the head unit 104 may receive (e.g., using the control system) user input via the one or more input devices of the head unit 104. The user input may relate to a transaction, that involves instruments, being performed at the head unit 104. For example, the transaction may relate to a user withdrawing one or more instruments via the head unit 104 and/or depositing one or more instruments via the head unit 104.

In the case of a deposit, the shuttle device 108 may be docked at the head unit 104 to accept the deposit from the user. For example, the head unit 104 may transmit (e.g., via the control system) a request for an empty shuttle, which may be routed to the head unit 104, via the transportation system 106, for loading. Moreover, the control system may cause docking and opening of the shuttle device 108 at the head unit 104. The user may load the instruments for deposit into the shuttle device 108, and the loaded shuttle device 108 may be transported to the handling unit 102 via the transportation system 106. For example, the control system may cause the shuttle device 108 to travel from the head unit 104 to the handling unit 102 via the transportation system 106.

The head unit 104 may transmit (e.g., via the control system) an instruction, based on the user input, to the handling unit 102. The instruction may indicate that one or more instruments are to be dispensed from the handling unit 102 (e.g., in connection with a withdrawal by the user) and/or that one or more instruments are to be deposited to the handling unit 102 (e.g., in connection with a deposit by the user). The shuttle device 108 may dock at the handling unit 102 and may automatically open (e.g., by a mechanism of the handling unit 102 and/or a mechanism of the shuttle device 108) to permit loading or unloading of instruments to the shuttle device 108. For example, based on receiving the instruction, the control system may cause the handling unit 102 to dock the shuttle device 108, and the control system may cause the handling unit 102 to open the shuttle device 108. In some implementations, the control system may cause the shuttle device 108 to be loaded to the handling unit 102 from a shuttle queue.

In the case of dispensing, the handling unit 102, in accordance with the instruction, may obtain (e.g., using one or more articulating arms, one or more conveyors, one or more rollers, and/or one or more flipping mechanisms, among other examples) the indicated instruments from the instrument storage component and load the indicated instruments into the shuttle device 108. For example, the control system may cause the handling unit 102 to load the shuttle device 108 with instruments based on the instruction. Moreover, the control system may cause the handling unit to close the shuttle device 108 after the instruments are loaded. In the case of depositing, the handling unit 102, in accordance with the instruction, may retrieve the indicated instruments from the shuttle device 108 and deposit the indicated instruments into the instrument storage component. For example, the control system may cause the handling unit 102 to retrieve the instruments from the shuttle device 108 based on the instruction. In some implementations (e.g., in the case of dispensing), the handling unit 102 may transmit (e.g., via the control system) a request for an empty shuttle, which may be routed to the handling unit 102, via the transportation system 106, for loading.

In the case of dispensing (e.g., in connection with a withdrawal by the user), the loaded shuttle device 108 may be transported to the head unit 104 via the transportation system 106. For example, the control system may cause the shuttle device 108 to travel from the handling unit 102 to the head unit 104 via the transportation system 106. The shuttle device 108 may dock at the head unit 104 and may automatically open (e.g., by a mechanism of the head unit 104 and/or a mechanism of the shuttle device 108) to permit the user to retrieve the instruments. For example, the control system may cause the head unit 104 to dock the shuttle device 108, and the control system may cause the head unit 104 to open the shuttle device 108. In some examples, the control system may determine (e.g., confirm) whether the shuttle device 108 is docked at the head unit 104 before causing the head unit 104 to open the shuttle device 108. In this way, the system 100 may facilitate user transactions, whereby the shuttle device 108 is used for transporting instruments to and from a user as well as for presenting instruments to the user.

FIG. 1B is a diagram of an example handling unit 102 of the system 100. As described above, the handling unit 102 may include a storage component 110. The storage component 110 may be configured to store instruments to be dispensed and/or instruments that have been deposited. For example, the storage component 110 may include a safe and/or a vault.

The handling unit 102 may include a dispenser 112. The dispenser 112 may interface with the storage component 110 (e.g., via one or more conveyors and/or one or more rollers) to dispense instruments from the storage component 110 and/or to deposit instruments to the storage component 110. The dispenser 112 may be configured to contain instruments for dispensing to the shuttle device 108. For example, the dispenser 112 may include a tray (e.g., upon which instruments may rest) and/or a slot (e.g., through which instruments may extend), among other examples. In some implementations, the dispenser 112 (or a separate component of the handling unit 102) may include a scanning component. The scanning component may process instruments dispensed from, or deposited to, the handling unit 102. For example, the scanning component (e.g., in connection with the control system) may identify the dispensed or deposited instruments, identify a value of the dispensed or deposited instruments, and/or identify a validity of the dispensed or deposited instruments, among other examples.

The handling unit 102 may include a shuttle dock 114. For example, the shuttle dock 114 may be located adjacent to the dispenser 112. The shuttle dock 114 may be configured to receive the shuttle device 108 from the transportation system 106. For example, the shuttle dock 114 may include a mechanism (e.g., an articulating arm, a conveyor, a roller, and/or a pivoting platform, among other examples) configured to transport the shuttle device 108 between the transportation system 106 and a docking location of the handling unit 102. In some implementations, the shuttle dock 114 may be located at an end, or at an opening, of a conduit of the transportation system 106 that interfaces with the handling unit 102 (e.g., the docking location of the head unit 104 is the end or the opening of the conduit).

The shuttle dock 114 may be configured to retain (i.e., dock) the shuttle device 108 at the handling unit 102 to permit the handling unit 102 to interact with the shuttle device 108 (e.g., to permit the handling unit 102 to load instruments into the shuttle device 108 or to remove instruments from the shuttle device 108). For example, the shuttle dock 114 may include a clamp configured to clamp ends of the shuttle device 108. Additionally, or alternatively, the shuttle dock 114 may include a first member of a coupling that engages with a second member of the coupling included in the shuttle device 108. For example, the coupling may include a magnetic (e.g., electromagnetic) coupling, a pin and bore coupling, and/or a threaded coupling, among other examples. The shuttle dock 114 may be further configured to release (e.g., by unclamping or uncoupling) the shuttle device 108 from the handling unit 102 back to the transportation system 106. In some implementations, the shuttle dock 114 may include a sensor (e.g., a proximity sensor and/or an interlock sensor, as described below) configured to detect whether the shuttle device 108 is docked in the shuttle dock 114.

The handling unit 102 may include an opening mechanism 116. In some implementations, the shuttle dock 114 and the opening mechanism 116 may be the same component or components of the same assembly. In some implementations, the opening mechanism 116 may be configured to perform one or more functions of the shuttle dock 114 described above. The opening mechanism 116 may be configured to open the shuttle device 108 (e.g., when the shuttle device 108 is docked) to expose an internal compartment (internal compartment 126, as described in connection with FIG. 1C) of the shuttle device 108.

The opening mechanism 116 may be configured to move between a first position, in which the shuttle device 108 is closed, and a second position, in which the shuttle device 108 is opened. In some implementations, the opening mechanism 116 may include an actuator component (e.g., one or more motors and/or linkages) that is configured to engage with a movable member of the shuttle device 108. Thus, the actuator component may move the movable member to expose the internal compartment of the shuttle device 108. The actuator component may be a rotary actuator, such as a stepper motor (e.g., for rotating the movable member), or a linear actuator (e.g., for sliding the movable member). In some implementations, the opening mechanism 116 may be further configured to close the shuttle device 108 to conceal the internal compartment of the shuttle device 108.

The handling unit 102 may include a shuttle queue 118. The shuttle queue 118 may be configured to hold one or more empty shuttles that are not in transport in the transportation system 106. For example, the shuttle queue 118 may interface with the transportation system 106, and an empty shuttle that is not in use may be routed (e.g., by the control system) from the transportation system 106 to the shuttle queue. Moreover, the shuttle queue 118 may be configured to load the shuttle device 108 to the shuttle dock 114. For example, the shuttle queue 118 may include a magazine in which shuttles are spring loaded, and the magazine may be configured to feed (e.g., when a gate of the magazine and/or the shuttle dock 114 is released) shuttles to the shuttle dock 114.

The handling unit 102 may include a loading mechanism 120. For example, the loading mechanism 120 may be integrated with the dispenser 112. The loading mechanism 120 may be configured to load instruments into the shuttle device 108 and/or to unload instruments from the shuttle device 108. The loading mechanism 120 may be configured to interface with the dispenser 112 and the shuttle device 108. For example, the loading mechanism 120 may be configured to transport instruments between the dispenser 112 and the shuttle device 108.

In some implementations, the loading mechanism 120 may include one or more conveyors (e.g., belts and/or drive wheels) configured to transport instruments between the dispenser 112 and the shuttle device 108. For example, a conveyor may transport one or more instruments from the dispenser 112 and slide the one or more instruments into the shuttle device 108 at an end of the conveyor. Additionally, or alternatively, the loading mechanism 120 may include one or more articulating arms configured to transport instruments between the dispenser 112 and the shuttle device 108. For example, an end of an articulating arm may include a retaining member (e.g., a clamp configured to move between an open configuration and a closed configuration) configured to retain and release one or more instruments. Additionally, or alternatively, the loading mechanism 120 may include one or more flipping members configured to flip instruments into the shuttle device 108. For example, a flipping member may include a platform that is configured to pivot between a first position (e.g., an upward horizontal position), in which instruments rest on the platform, and a second position (e.g., a vertical position or a downward horizontal position) in which instruments fall from the platform (e.g., into the shuttle device 108). The handling unit 102 may transport instruments to the one or more flipping members using one or more conveyors and/or one or more articulating arms, as described above.

The handling unit 102 may include one or more sensors 122. The sensor 122 may be oriented at the handling unit 102 to collect information relating to contents of the shuttle device 108 (e.g., when the shuttle device 108 is docked at the handling unit 102, when the shuttle device 108 is arriving at the handling unit 102, and/or when the shuttle device 108 is leaving the handling unit 102). The sensor 122 may be a proximity sensor (e.g., one or more of an optical sensor, a camera sensor, an infrared (IR) sensor, an ultrasonic sensor, a depth sensor, a three-dimensional imaging sensor, and/or a point-distance capturing sensor).

In some implementations, a sensor 122 may be an interlock sensor. For example, the interlock sensor may be a mechanical interlock, a magnetic interlock, and/or a proximity interlock (e.g., that uses wireless communication, such as RFID or near-field communication (NFC)). The interlock sensor of the handling unit 102 may be configured to couple with (e.g., mechanically or wirelessly) an interlock sensor of the shuttle device 108 (e.g., to communicate a particular interlock identifier). Coupling of the respective interlock sensors may indicate arrival of the shuttle device 108 at the handling unit 102. Accordingly, based on whether coupling of the respective interlock sensors is detected, the control system may cause (or prevent) docking of the shuttle device 108, opening of the shuttle device 108, and/or dispensing by the handling unit 102, among other examples. In some implementations, the transportation system 106 may include an interlock sensor (e.g., at an end of a conduit that interfaces with the handling unit 102) configured to couple with the interlock sensor of the shuttle device 108, as described above.

In some implementations, the shuttle dock 114, the opening mechanism 116, the shuttle queue 118, the loading mechanism 120, and/or the one or more sensors 122 may be included in a first assembly of the handling unit 102, and the storage component 110 and/or the dispenser 112 may be included in a second assembly of the handling unit 102. Here, the first assembly and the second assembly may be attached. For example, the first assembly may attach to the dispenser 112 of the second assembly.

In some implementations, the head unit 104 may include a shuttle dock, an opening mechanism, and/or one or more sensors, in a similar manner as described above. For example, the shuttle dock of the head unit 104 may be configured to receive the shuttle device 108 from the transportation system 106, and to retain (i.e., dock) the shuttle device 108 in the head unit 104 to permit user interaction with the shuttle device 108 (e.g., to permit a user to load instruments into the shuttle device 108 or to remove instruments from the shuttle device 108). In particular, the shuttle dock of the head unit 104 may be configured to dock the shuttle device 108 at a presentation opening between an interior side and an exterior side of the head unit 104. In this way, contents of the shuttle device 108 may be directly transferrable (e.g., without any intervening conveyance mechanisms, such as rollers or conveyors) from the shuttle device 108 to the exterior side of the head unit 104 via the presentation opening.

FIG. 1C is a diagram of an example shuttle device 108 of the system 100. The shuttle device 108 may include an external shell 124 that defines the internal compartment 126 of the shuttle device 108. As shown, one or more instruments may be contained in the internal compartment 126 of the shuttle device 108. The shuttle device 108 may be cylindrical, as shown, or may be another suitable shape (e.g., corresponding to a shape of the conduits of the transportation system 106). The shuttle device 108 may include a movable member, as described above. The movable member may be moved (e.g., by the opening mechanism 116 of the handling unit 102) from a first position, which conceals the internal compartment 126, to a second position which exposes the internal compartment 126. In some implementations, the movable member may be configured for movement by rotation, raising, lowering, sliding, or the like.

In one example, the external shell 124 may include an outer shell member and an inner shell member that are rotationally engaged. Here, the outer shell member (i.e., the movable member) may be configured to rotate relative to the inner shell member to expose the internal compartment 126. Thus, the opening mechanism 116 of the handling unit 102 may be configured to rotate the outer shell member, relative to the inner shell member, to expose the internal compartment 126. In another example, the external shell 124 may include a lid member and a base member connected by a hinge (e.g., a clam shell configuration). Here, the opening mechanism 116 of the handling unit 102 may be configured to raise or rotate the lid member, relative to the base member, to expose the internal compartment 126. In a further example, the external shell 124 may include a lid member and a base member that are slidably engaged (e.g., using a pin and groove connection). Here, the opening mechanism 116 of the handling unit 102 may be configured to slide the lid member, relative to the base member, to expose the internal compartment 126.

The shuttle device 108 may include a docking mechanism 128 (e.g., in addition, or as an alternative, to the shuttle dock 114 of the handling unit 102). For example, the shuttle device 108 may include the docking mechanism 128 on an end face of the shuttle device 108 (e.g., a base of a cylindrical shuttle device 108). The docking mechanism 128 may be configured to retain the shuttle device 108 at the handling unit 102, in a similar manner as described above. Additionally, or alternatively, the docking mechanism 128 may couple with the shuttle dock 114 of the handling unit 102 (e.g., by a coupling, as described above), and the coupled shuttle dock 114/docking mechanism 128 may operate together to dock the shuttle device 108 at the handling unit 102.

The shuttle device 108 may include an opening mechanism 130 (e.g., in addition, or as an alternative, to the opening mechanism 116 of the handling unit 102). For example, the shuttle device 108 may include the opening mechanism 130 on an end face of the shuttle device 108 (e.g., a base of a cylindrical shuttle device 108). The opening mechanism 130 may be configured to open the shuttle device 108 (e.g., when the shuttle device 108 is docked) to expose the internal compartment 126 of the shuttle device 108, in a similar manner as described above. Additionally, or alternatively, the opening mechanism 130 may couple with the opening mechanism 116 of the handling unit 102, and the coupled opening mechanisms 116, 130 may operate together to open the shuttle device 108.

In some examples, the opening mechanism 130 of the shuttle device 108 may include a biasing member (e.g., a spring). The biasing member may bias the shuttle device 108 (e.g., the movable member of the shuttle device 108) to an open configuration. For example, the conduit(s) of the transportation system 106 may force the shuttle device 108 into a closed configuration, but upon exiting the conduit(s), the biasing member may open the shuttle device 108. In some aspects, the shuttle device 108 may include a closing member (not shown). The closing member may also be a biasing member (e.g., a spring). Here, the biasing member may bias the shuttle device 108 (e.g., the movable member of the shuttle device 108) to a closed configuration. The opening mechanism 116 and/or the opening mechanism 130 may overcome the resistance of the biasing member in order to open the shuttle device 108. Thus, the biasing member may close the shuttle device 108 upon disengagement of the opening mechanism 116 and/or the opening mechanism 130.

The shuttle device 108 may include a presentation mechanism 132. The shuttle device 108 may include the presentation mechanism 132 in the internal compartment 126 of the shuttle device 108. The presentation mechanism 132 may be configured to grasp or contain instruments in the internal compartment 126. Accordingly, the loading mechanism 120 may load instruments to, or unload instruments from, the presentation mechanism 132. The presentation mechanism 132 may be configured to outwardly project instruments (e.g., that are grasped or contained) from the shuttle device 108, or otherwise position instruments for retrieval by a user at the head unit 104. For example, the presentation mechanism 132 may include an arm that is configured to project from the shuttle device 108 when the shuttle device 108 is opened. As another example, the presentation mechanism 132 may include a drawer that is configured to project from the shuttle device 108 when the shuttle device 108 is opened.

In some implementations, the presentation mechanism 132 may operate in tandem with the movable member of the shuttle device 108 (e.g., the presentation mechanism 132 may be configured to project from the shuttle device 108 in response to opening of the shuttle device 108). For example, the presentation mechanism 132 may be tied to the movable member (e.g., by one or more linkages or other mechanisms) such that movement of the movable member causes movement of the presentation mechanism 132. As an example, opening of the movable member may cause the presentation mechanism 132 to project from the shuttle device 108, and closing of the movable member may cause the presentation mechanism 132 to withdraw into the shuttle device 108. In some implementations, the presentation mechanism 132 may include a biasing member (e.g., a spring) configured to project the presentation mechanism 132 from the shuttle device 108 when the shuttle device 108 is open. In some implementations, the shuttle device 108 may include one or more actuators configured to control a movement of the presentation mechanism 132.

The shuttle device 108 may include one or more sensors 134. A sensor 134 may be oriented in the shuttle device 108 to collect information relating to contents of the shuttle device 108 (e.g., when the shuttle device 108 is docked at the handling unit 102, when the shuttle device 108 is arriving at the handling unit 102, and/or when the shuttle device 108 is leaving the handling unit 102), in a similar manner as described above. For example, the sensor 134 may be a proximity sensor, as described above.

The shuttle device 108 may include a power source (not shown) configured to power one or more of the docking mechanism 128, the opening mechanism 130, the presentation mechanism 132, and/or the sensor 134. For example, the power source may be a battery. Additionally, or alternatively, the shuttle device 108 may include a power connection system. The power connection system may be configured to receive power from the handling unit 102, the head unit 104, and/or the transportation system 106. For example, the power connection system may include one or more contacts (and associated wiring) on an exterior of the shuttle device 108. The one or more contacts may interface with corresponding contacts placed at the handling unit 102, the head unit 104, and/or the transportation system 106. In this way, the shuttle device 108 may receive power from the handling unit 102, the head unit 104, and/or the transportation system 106 when the one or more contacts of the shuttle device 108 and the corresponding contacts are in electrical contact. In some implementations, the shuttle device 108 may be unpowered, and any powered operations described herein (e.g., opening the shuttle device 108) may be performed by the handling unit 102, the head unit 104, and/or the transportation system 106.

In some implementations, the control system (e.g., a processor of the handling unit 102 and/or a processor of the shuttle device 108) may obtain information from the sensor 122 of the handling unit 102 and/or the sensor 134 of the shuttle device 108. For example, the control system may obtain the information after opening of the shuttle device 108, after closing of the shuttle device 108, and/or after loading of instruments into the shuttle device 108. The information may enable the control system to determine whether contents (e.g., instruments or foreign objects) are present in the shuttle device 108. For example, the information may be proximity information that is indicative of whether contents are present in the shuttle device 108. As another example, the information may be image information, and the control system may perform a computer vision technique, using the image information, to determine whether contents are present in the shuttle device 108.

In some examples, the control system may determine, based on the information, that contents are present in the shuttle device 108. In the case of a withdrawal (e.g., the instruments were successfully loaded into the shuttle device 108), the control system may cause the shuttle device 108 to close and/or to travel from the handling unit 102 to the head unit 104. In addition, the control system may transmit information for display at the head unit 104. For example, the information may indicate that the requested withdrawal has been dispatched to the head unit 104 and/or indicate an estimated time of arrival of the shuttle device 108 at the head unit 104 (e.g., based on historical transit time information and/or based on tracking a location of the shuttle device 108 through the transportation system 106, as described above). In the case of a deposit (e.g., the instruments loaded to the shuttle device 108 by a user successfully arrived at the handling unit 102), the control system may cause the handling unit 102 to unload the shuttle device 108.

In some examples, the control system may determine, based on the information, that contents are not present in the shuttle device 108. In the case of a withdrawal (e.g., the instruments were not successfully loaded into the shuttle device 108), the control system may cause the handling unit 102 to perform another attempt at loading the shuttle device 108 and/or the control system may provide a notification to an operator of the system 100. In the case of a deposit (e.g., the instruments loaded to the shuttle device 108 by a user did not successfully arrive at the handling unit 102 or the user did not load instruments to the shuttle device 108), the control system may cause the head unit 104 to provide an alert indicating that contents are not present in the shuttle device 108, the control system may cause the same or a different shuttle device 108 to travel to the head unit 104 for another attempt at loading, and/or the control system may provide a notification to an operator of the system 100.

In some examples, the control system may determine, based on the information (e.g., image information), a count and/or an amount of the contents in the shuttle device 108. For example, in the case of a deposit, the control system may provide the count/amount information to the handling unit 102 prior to the shuttle device 108 arriving at the handling unit 102.

As indicated above, FIGS. 1A-1C are provided as an example. Other examples may differ from what is described with regard to FIGS. 1A-1C.

Figure 2:
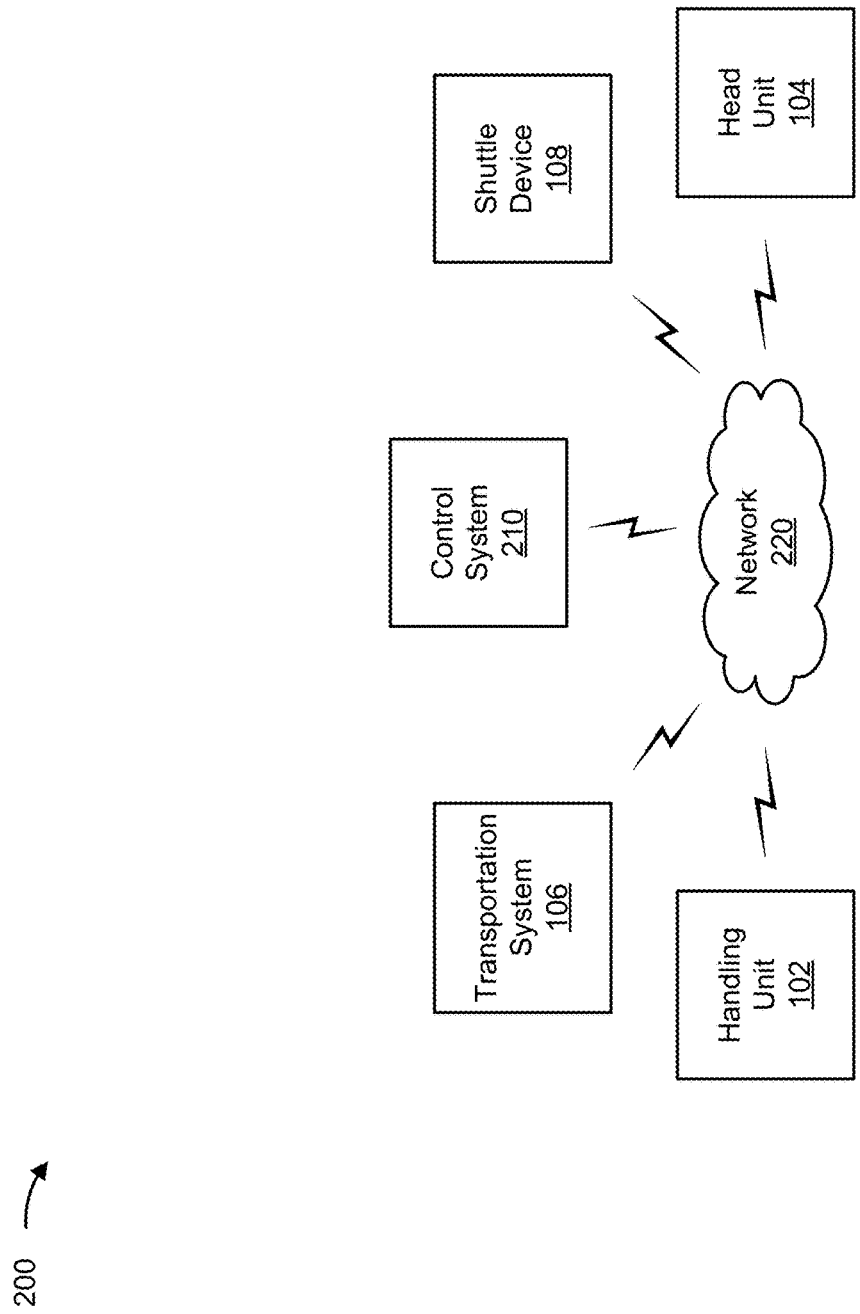
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a handling unit 102, a head unit 104, a transportation system 106, a shuttle device 108, a control system 210, and a network 220. Devices of environment 200 may interconnect via wired connections, wireless connections, or a combination of wired and wireless connections.

The handling unit 102 includes one or more devices capable of storing, dispensing, and depositing instruments. For example, the handling unit 102 may include a safe or a vault configured to safeguard instruments, such as cash. In some implementations, the handling unit 102 may include one or more computing devices. In some implementations, the handling unit 102 may provide instruments to one or more head units 104 based on transactions initiated by one or more users, as described elsewhere herein.

The head unit 104 includes one or more devices capable of interacting with a user to facilitate various types of transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), or the like. For example, the head unit 104 may be an ATM, or the head unit 104 may include one or more components of an ATM. In some implementations, the head unit 104 may receive instruments stored in and/or provided by the handling unit 102, and output the instruments to a user, as described elsewhere herein. In some implementations, the head unit 104 may include one or more computing devices.

The head unit 104 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the head unit 104 include a number keypad, a touchscreen, a magnetic stripe reader, a chip reader, and/or a radio frequency (RF) signal reader (e.g., a near-field communication (NFC) reader). Example output devices of the head unit 104 include a display and/or a speaker.

The transportation system 106 includes one or more devices capable of physically transporting instruments between devices. In some implementations, the transportation system 106 may be arranged to interface the handling unit 102 and the head unit 104, as described elsewhere herein. In some implementations, the transportation system 106 may include a plurality of interconnecting conduits, as described elsewhere herein. In some implementations, the transportation system 106 may include one or more computing devices.

The shuttle device 108 includes one or more devices capable of physically containing instruments that are transported between devices. In some implementations, the shuttle device 108 may be configured to travel within the transportation system 106. In some implementations, the shuttle device 108 may include one or more computing devices.

The control system 210 includes one or more devices capable of orchestrating operations of the handling unit 102, the head unit 104, the transportation system 106, and/or the shuttle device 108. For example, the control system 210 includes one or more devices capable of receiving, generating, storing, processing, providing, and/or routing information associated with instrument conveyance using a shuttle, as described elsewhere herein. For example, the control system 210 may include a server, such as an application server, a client server, a web server, a database server, a host server, a proxy server, a virtual server (e.g., executing on computing hardware), or a server in a cloud computing system. In some implementations, the control system 210 includes computing hardware used in a cloud computing environment. In addition, the control system 210 may be centralized or distributed among the handling unit 102, the head unit 104, the transportation system 106, and/or the shuttle device 108, as described elsewhere herein.

The network 220 includes one or more wired and/or wireless networks. For example, the network 220 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 220 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
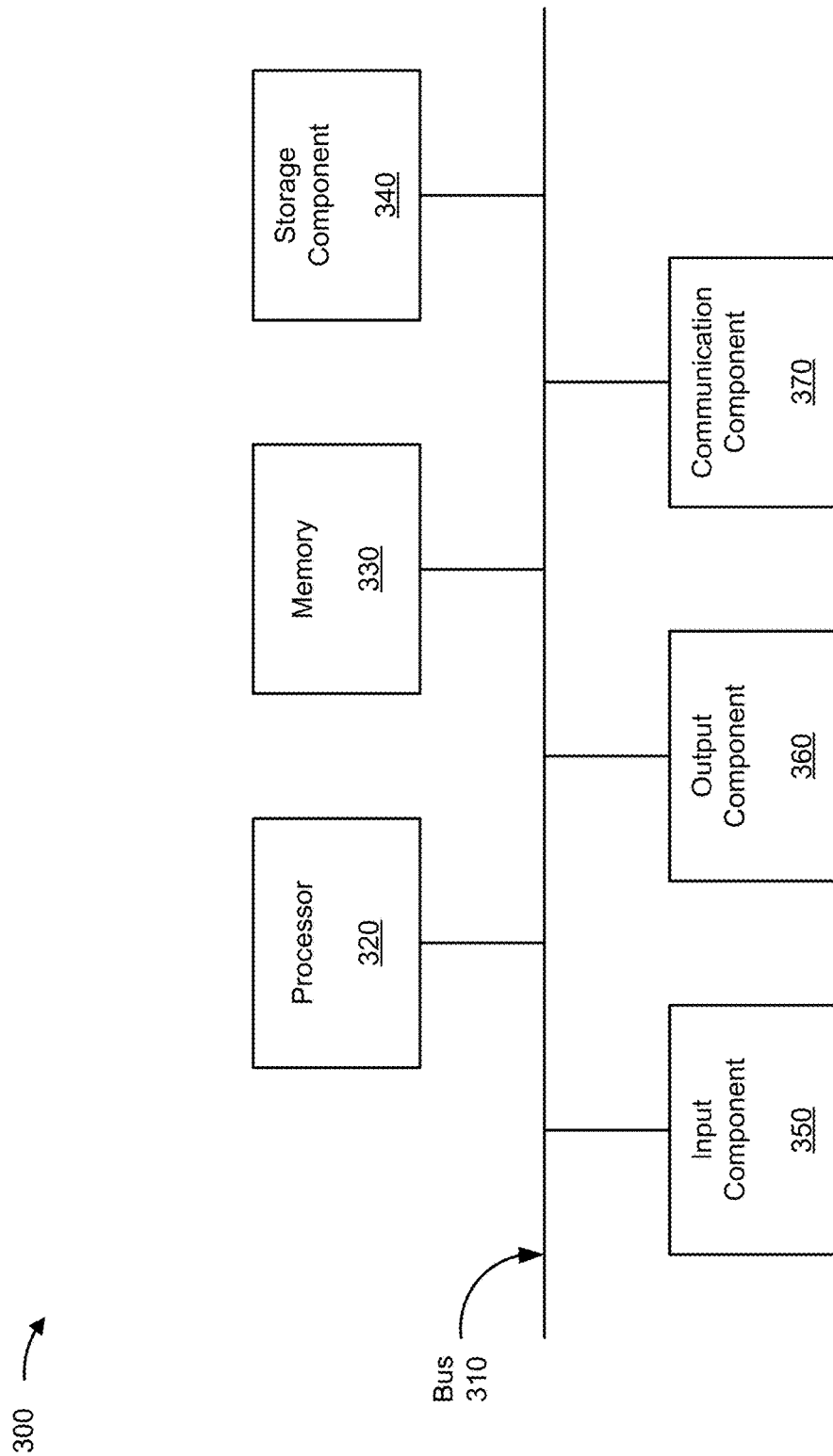
FIG. 3 is a diagram of example components of one or more devices of FIG. 2.

FIG. 3 is a diagram of example components of a device 300, which may correspond to handling unit 102, head unit 104, transportation system 106, shuttle device 108, and/or control system 210. In some implementations, handling unit 102, head unit 104, transportation system 106, shuttle device 108, and/or control system 210 may include one or more devices 300 and/or one or more components of device 300.

As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
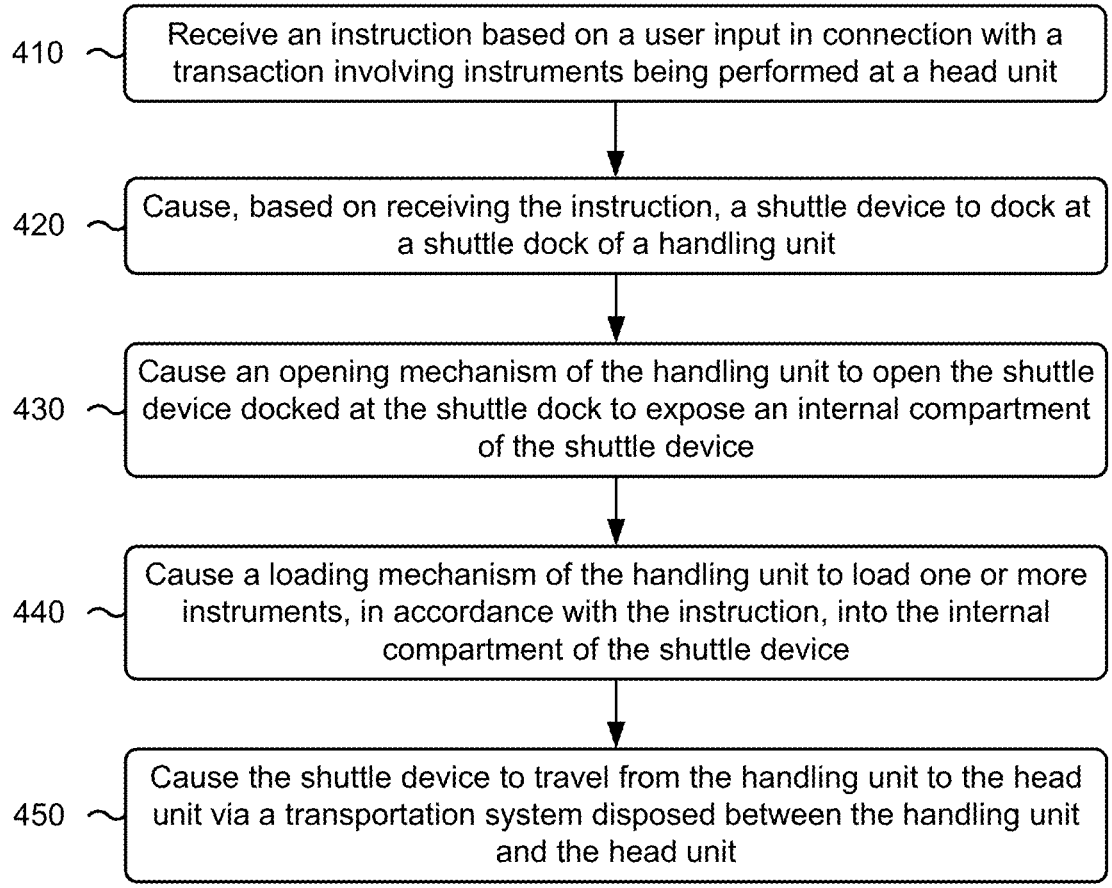
FIG. 4 is a flowchart of an example process relating to instrument conveyance using a shuttle.

FIG. 4 is a flowchart of an example process 400 associated with instrument conveyance using a shuttle. In some implementations, one or more process blocks of FIG. 4 may be performed by a processor of a handling unit (e.g., handling unit 102). In some implementations, one or more process blocks of FIG. 4 may be performed by another device or a group of devices separate from or including the processor of the handling unit, such as a processor of head unit 104, transportation system 106, shuttle device 108, and/or control system 210. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an instruction based on a user input in connection with a transaction involving instruments being performed at a head unit (block 410). As further shown in FIG. 4, process 400 may include causing, based on receiving the instruction, a shuttle device to dock at a shuttle dock of a handling unit (block 420). As further shown in FIG. 4, process 400 may include causing an opening mechanism of the handling unit to open the shuttle device docked at the shuttle dock to expose an internal compartment of the shuttle device (block 430). As further shown in FIG. 4, process 400 may include causing a loading mechanism of the handling unit to load one or more instruments, in accordance with the instruction, into the internal compartment of the shuttle device (block 440). As further shown in FIG. 4, process 400 may include causing the shuttle device to travel from the handling unit to the head unit via a transportation system disposed between the handling unit and the head unit (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for instrument conveyance, the system comprising:
   a shuttle device comprising an internal compartment for containing instruments;
   at least one handling unit configured to dispense the instruments,
      wherein the handling unit comprises:
         an opening mechanism configured to open the shuttle device by rotating an outer shell member, relative to an inner shell member, to expose the internal compartment of the shuttle device,
         a magazine mechanism, included in a shuttle queue, configured to load the shuttle device to a shuttle dock, and
         a loading mechanism configured to load the instruments into the internal compartment of the shuttle device;
   at least one head unit configured to obtain input from a user in connection with a transaction involving the instruments; and
   a transportation system disposed between the at least one handling unit and the at least one head unit,
      wherein the transportation system includes one or more conduits, and
      wherein the transportation system is configured to transport the shuttle device between the at least one handling unit and the at least one head unit.

2. The system of claim 1, wherein the at least one head unit comprises a plurality of head units.

3. The system of claim 1, wherein a quantity of head units of the at least one head unit is greater than a quantity of handling units of the at least one handling unit.

4. The system of claim 1, wherein the shuttle device further comprises a biasing member configured to bias the shuttle device to a closed configuration.

5. The system of claim 1, wherein the at least one handling unit further comprises the shuttle dock configured to dock the shuttle device at the at least one handling unit.

6. The system of claim 1, wherein the loading mechanism is configured to interface with a dispenser of the at least one handling unit.

7. The system of claim 1, wherein the one or more conduits of the transportation system comprises one or more tubes.

8. The system of claim 1, further comprising:
one or more memories; and
one or more processors, communicatively coupled to the one or more memories, configured to:
- cause the at least one handling unit to load the shuttle device with the instruments based on inputs obtained at the at least one head unit; and
- cause the shuttle device to travel from the at least one handling unit to the at least one head unit via the transportation system.

9. A handling unit, comprising:
- a dispenser configured to contain instruments for dispensing to a shuttle device;
- a shuttle dock configured to dock the shuttle device at the handling unit;
- an opening mechanism configured to open the shuttle device by rotating an outer shell member, relative to an inner shell member, to expose an internal compartment of the shuttle device;
- a magazine mechanism, included in a shuttle queue, configured to load the shuttle device to the shuttle dock; and
- a loading mechanism configured to load the instruments from the dispenser into the internal compartment of the shuttle device.

10. The handling unit of claim 9, wherein the opening mechanism is further configured to close the shuttle device to conceal the internal compartment of the shuttle device.

11. The handling unit of claim 9, wherein the loading mechanism comprises one or more flipping members configured to flip the instruments into the internal compartment of the shuttle device.

12. The handling unit of claim 9, wherein the loading mechanism comprises one or more conveyors configured to transport the instruments into the internal compartment of the shuttle device.

13. The handling unit of claim 9, wherein the loading mechanism comprises one or more arms configured to transport the instruments into the internal compartment of the shuttle device.

14. The handling unit of claim 9, wherein the shuttle dock is further configured to release the shuttle device to a transportation system for the shuttle device.

15. The handling unit of claim 9, wherein the magazine mechanism is spring loaded.

16. A method of instrument conveyance, comprising:
receiving, by a processor, an instruction based on a user input in connection with a transaction involving one or more instruments being performed at a head unit;
causing, by the processor and based on receiving the instruction, a shuttle device to dock at a shuttle dock of a handling unit,
- wherein causing the shuttle device to dock at the shuttle dock comprises:
  - causing a magazine mechanism, of a shuttle queue of the handling unit, to load the shuttle device to the shuttle dock;
causing, by the processor, an opening mechanism of the handling unit to open the shuttle device docked at the shuttle dock by rotating an outer shell member, relative to an inner shell member, to expose an internal compartment of the shuttle device;
causing, by the processor, a loading mechanism of the handling unit to load one or more instruments, in accordance with the instruction, into the internal compartment of the shuttle device; and
causing, by the processor, the shuttle device to travel from the handling unit to the head unit via a transportation system disposed between the handling unit and the head unit.

17. The method of claim 16, further comprising:
causing, after causing the loading mechanism to load the one or more instruments, the opening mechanism of the handling unit to close the shuttle device to conceal the internal compartment of the shuttle device.

18. The method of claim 16, further comprising:
obtaining, after causing the loading mechanism to load the one or more instruments, information from one or more sensors of at least one of the handling unit or the shuttle device; and
determining, based on the information, whether contents are present in the internal compartment of the shuttle device,
- wherein the shuttle device is caused to travel from the handling unit to the head unit based on determining that the contents are present in the internal compartment of the shuttle device.

19. The method of claim 16, wherein the handling unit is remotely located from the head unit.

20. The method of claim 16, wherein the magazine mechanism is spring loaded.

* * * * *